US011941970B1

(12) United States Patent
Beckers et al.

(10) Patent No.: US 11,941,970 B1
(45) Date of Patent: Mar. 26, 2024

(54) UNIFIED MANAGEMENT AND PROCESSING OF MULTI-TYPE EMERGENCY COMMUNICATIONS IN VOICE OVER INTERNET PROTOCOL (VOIP) ENVIRONMENTS

(71) Applicant: Bandwidth Inc., Raleigh, NC (US)

(72) Inventors: Max Beckers, Denver, CO (US); Adam Galaska, Rush, NY (US); Abdulkareem Alali, North Bend, WA (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 18/385,458

(22) Filed: Oct. 31, 2023

(51) Int. Cl.
| | |
|---|---|
| *G08B 25/00* | (2006.01) |
| *H04L 65/1045* | (2022.01) |
| *H04M 3/51* | (2006.01) |
| *H04W 76/50* | (2018.01) |

(52) U.S. Cl.
CPC ........ *G08B 25/006* (2013.01); *H04L 65/1045* (2022.05); *H04M 3/5116* (2013.01); *H04W 76/50* (2018.02)

(58) Field of Classification Search
CPC .. G08B 25/006; H04W 76/50; H04L 65/1045; H04M 3/5116

USPC .......................................................... 379/45
See application file for complete search history.

(56) References Cited

U.S. PATENT DOCUMENTS

| | | | | |
|---|---|---|---|---|
| 10,805,462 | B1 * | 10/2020 | Ginter ................... | H04L 67/563 |
| 11,695,871 | B2 * | 7/2023 | Leavitt .................... | H04L 67/02 |
| | | | | 379/45 |
| 2006/0115072 | A1 * | 6/2006 | Kessinger ........... | H04M 3/5175 |
| | | | | 379/265.03 |
| 2007/0116189 | A1 * | 5/2007 | Clawson ................ | H04M 11/04 |
| | | | | 379/37 |
| 2022/0053607 | A1 * | 2/2022 | Rice .................. | H04W 36/0069 |

* cited by examiner

*Primary Examiner* — Maria El-Zoobi
(74) *Attorney, Agent, or Firm* — Gregory Stephens

(57) ABSTRACT

Disclosed herein is a call coordination system configured to manage both static-type and dynamic-type emergency calls via a singular IP address and a single set of SIP peering connections. The call coordination system a unified structural framework wherein individual accounts, whether static or dynamic, are structured into hierarchical parent-child relationships to form linked accounts. These linked accounts can include both static-type and dynamic-type ES accounts. Upon receipt of an incoming call, the call coordination system can determine the call type and processes the call accordingly.

20 Claims, 6 Drawing Sheets

Civic Address/Location Value (LBV) Example:

```
"original_host": "192.168.8.84",
"call_id": "335851879_61729237@192.168.18.37",
"dnis": "933",
"from": "17572502709",
"account_id": "9900812",
"contact": "<sip:17572502709@192.168.18.37:5060;transport=tcp>",
"pidflo": "<?xml version=\"1.0\"
encoding=\"UTF-8\"?>\n<presence\nxmlns=\"urn:ietf:params:xml:ns:pidft"\nxmlns:
id=\"target123-1\">\n<gp:geopriv>\n<gp:location-info>\n<ca:c/v/cAddress>\n<ca:
CAMPUS<Vca:RD>Vca:RD>\n<ca:STS>DR<Vca:STS>\n<ca:HNO>900<Vca:HNO>\n<ca:LO>
```

FIG. 3A

Lat/Long Example:

```
"siteid": "14691",
"peer_ip": "192.168.18.37",
"original_host": "192.168.8.84",
"call_id": "336374822_107973662@192.168.18.37",
"dnis": "933",
"from": "17572502709",
"reserve_esqk": true,
"account_id": "9900812",
"contact": "<sip:17572502709@192.168.18.37:5060;transport=tcp>",
"pidflo": "<?xml version='1.0' encoding='UTF-8'?><presence
xmlns='urn:ietf:params:xml:ns:pidf'
xmlns:gp='urn:ietf:params:xml:ns:pidf:geopriv'><gp:geopriv><gp:location-
info><gml:Point srsName='urn:ogc:def:crs:EPSG::4326'><gml:pos>35.773376 -
78.677722</gml:pos></gml:Point></gp:location-info></gp:geopriv></presence>"
```

FIG. 3B

Geo-Location/Location by Reference (LBR) Example:

```
"siteid": "14691",
"peer_ip": "192.168.18.37",
"original_host": "192.168.8.84",
"call_id": "336374853_114259790@192.168.18.37",
"dnis": "911",
"from": "19196190004",
"reserve_esqk": true,
"account_id": "9900812",
"contact": "<sip:19196190004@192.168.18.37:5060; transport=tcp>",
"geolocation": "<https://emergency.bandwidth.com/locations/9900812/TestNC>"
```

FIG. 3C

911 Standard Example:

```
"siteid": "14691",
"peer_ip": "192.168.18.37",
"original_host": "192.168.8.84",
"call_id": "336374853_114259790@192.168.18.37",
"dnis": "911",
"from": "19196190004",
"reserve_esqk": true,
"account_id": "9900812",
"contact": "<sip:19196190004@192.168.18.37:5060;transport=tcp>"
```

FIG. 3D

UNIFIED MANAGEMENT AND PROCESSING OF MULTI-TYPE EMERGENCY COMMUNICATIONS IN VOICE OVER INTERNET PROTOCOL (VOIP) ENVIRONMENTS

FIELD

The present inventive concept relates generally to telecommunications and, more particularly, to a system and method for managing and routing emergency calls in Voice over Internet Protocol (VoIP) networks.

BACKGROUND

Voice over Internet Protocol (VoIP) technology allows for the transmission of voice or multimedia content over the Internet, offering an efficient and cost-effective method of communication. In the context of emergency calling, regulations require that end users of interconnected VoIP networks be able to dial 911 and be connected to the nearest Public Safety Answering Point (PSAP) based on their location.

SUMMARY

Disclosed herein is a call coordination system configured to manage both static-type and dynamic-type emergency calls via a singular IP address and a single set of SIP peering connections. The call coordination system a unified structural framework wherein individual accounts, whether static or dynamic, are structured into hierarchical parent-child relationships to form linked accounts. These linked accounts can include both static-type and dynamic-type ES accounts. Upon receipt of an incoming call, the call coordination system can determine the call type and processes the call accordingly.

Disclosed herein are methods of handling emergency services telephony calls within a communication system. A method can include forming a consolidated account structure by associating two or more emergency services accounts. Each emergency services account can be characterized by a distinct call type indicative of a specific methodology for processing location data. Each emergency services account can include multiple endpoint records. Each endpoint record can be uniquely identifiable across the consolidated account structure. The method can include receiving an emergency services call request via a first point of presence. The emergency services call request can include an endpoint identifier. The method can include determining a call type of the emergency services call request based on a presence or absence of location data within the emergency services call request. The call type can be a static type or dynamic type. The method can include identifying a particular emergency services account from the consolidated account structure based on the endpoint identifier. The identifying can include determining which emergency services account of the consolidated account structure includes an endpoint record corresponding to the endpoint identifier. The method can include facilitating processing of the emergency services call request based on the call type and the particular emergency services account.

The method of the preceding paragraph can include any combination of the steps of features disclosed in this paragraph, among others described herein. Forming the consolidated account structure can include creating a hierarchical account architecture, in which one of the two or more emergency services accounts can be designated as a parent account, and all other emergency services accounts are designated as child accounts. Forming the consolidated account structure can include configuring all child accounts to inherit an IP address associated with the parent account for routing emergency calls. Forming the consolidated account structure can include selecting a standard VOIP 911 account as the parent account. Forming the consolidated account structure can include analyzing the endpoint records across the consolidated account structure to identify and removing or modifying duplicate endpoint records to ensure their uniqueness within the consolidated account structure. The two or more emergency services accounts can include a first emergency services account and a second emergency services account. The first emergency services account can include a plurality of first records associated with a first call type. The second emergency services account can include a plurality of second records associated with a second call type. The first call type can be different from the second call type. The consolidated account structure can include accounts associated with both static-type and dynamic-type emergency calls.

The method of any of the preceding paragraphs can include any combination of the steps of features disclosed in this paragraph, among others described herein. Determining the call type can include inspecting a SIP header of the emergency services call request for a presence or absence of location data in the SIP header. The presence of the location data in the SIP header can indicate a dynamic type. The absence of the location data in the SIP header can indicate a static type. Determining the call type can include identifying one or more sub-types of dynamic emergency calls based on location data within the SIP header.

Disclosed herein are methods of creating a consolidated account structure for emergency services telephony calls within a communication system. A method can include identifying a first emergency services account that includes a plurality of first records. The first emergency services account can be associated with a first call type indicative of a first methodology for processing location data. The method can include identifying a second emergency services account that includes a plurality of second records. The second emergency services account can be associated with a second call type that is different from the first call type. The second call type can be indicative of a second methodology for processing location data. The method can include designating the first emergency services account as a parent account based on a consolidation policy. The consolidation policy can indicate that an account of the first call type should be selected as the parent account. The method can include designating the second emergency services account as a child account; identifying at least one common record from the plurality of first records and the plurality of second records; removing or modifying the common record from the plurality of second records based at least in part on the second emergency services account being selected as the child account; and forming a consolidated account structure by hierarchically linking the parent account and the child account. Forming the consolidated account structure can include configuring the child account to inherit a point of presence associated with the parent account for routing emergency calls. Emergency calls associated with any of the first emergency services account or the second emergency services account can be transmitted over the inherited point of presence (e.g., an IP address).

The method of any of the preceding paragraphs can include any combination of the steps of features disclosed in this paragraph, among others described herein. The first call type can be a static type and the second call type can be a dynamic type. The method can include receiving an emergency services call request via the inherited point of presence. The emergency services call request can include an endpoint identifier. The method can include identifying a particular emergency services account from the consolidated account structure based on the endpoint identifier. Identifying can include determining which emergency services account of the consolidated account structure can include an endpoint record corresponding to the endpoint identifier. The method can include determining a call type of the emergency services call request based on a presence or absence of location data within the emergency services call request. The call type can be a static type or dynamic type. The method can include facilitating processing of the emergency services call request based on the call type. Determining the call type can include inspecting a SIP header of the emergency services call request for the presence or absence of location data. The presence of the location data in the SIP header can indicate a dynamic type. The absence of the location data in the SIP header can indicate a static type. Determining the call type can include identifying one or more sub-types of dynamic emergency calls based on location data within the SIP header.

Non-transitory computer readable media can include computer-executable instructions that, when executed by a computing system, cause the computing system to receive an emergency services call request via a first point of presence, the emergency services call request can include an endpoint identifier; determine a call type of the emergency services call request based on a presence or absence of location data within the emergency services call request. The call type can be a static type or dynamic type; identify a particular emergency services account from a consolidated account structure based on the endpoint identifier. to identify can include determining which emergency services account of the consolidated account structure can include an endpoint record corresponding to the endpoint identifier; and facilitate processing of the emergency services call request based on the call type and the particular emergency services account.

Non-transitory computer readable media can include computer-executable instructions that, when executed by a computing system, cause the computing system to identify a first emergency services account that includes a plurality of first records, the first emergency services account associated with a first call type indicative of a first methodology for processing location data; identify a second emergency services account that includes a plurality of second records, the second emergency services account associated with a second call type that is different than the first call type, the second call type indicative of a second methodology for processing location data; designate the first emergency services account as a parent account based on a consolidation policy, wherein the consolidation policy indicates that an account of the first call type should be selected as the parent account; designate the second emergency services account as a child account; identify at least one common record from the plurality of first records and the plurality of second records; remove or modify the common record from the plurality of second records based at least in part on the second emergency services account being selected as the child account; and/or form a consolidated account structure by hierarchically linking the parent account and the child account, wherein forming the consolidated account structure includes configuring the child account to inherit a point of presence associated with the parent account for routing emergency calls, wherein emergency calls associated with any of the first emergency services account or the second emergency services account can be transmitted over the inherited point of presence.

BRIEF DESCRIPTION OF THE DRAWINGS

FIGS. 3A-3D illustrate various SIP INVITE messages with different combinations of headers and parameters.

DETAILED DESCRIPTION OF EMBODIMENTS

Figure 1:
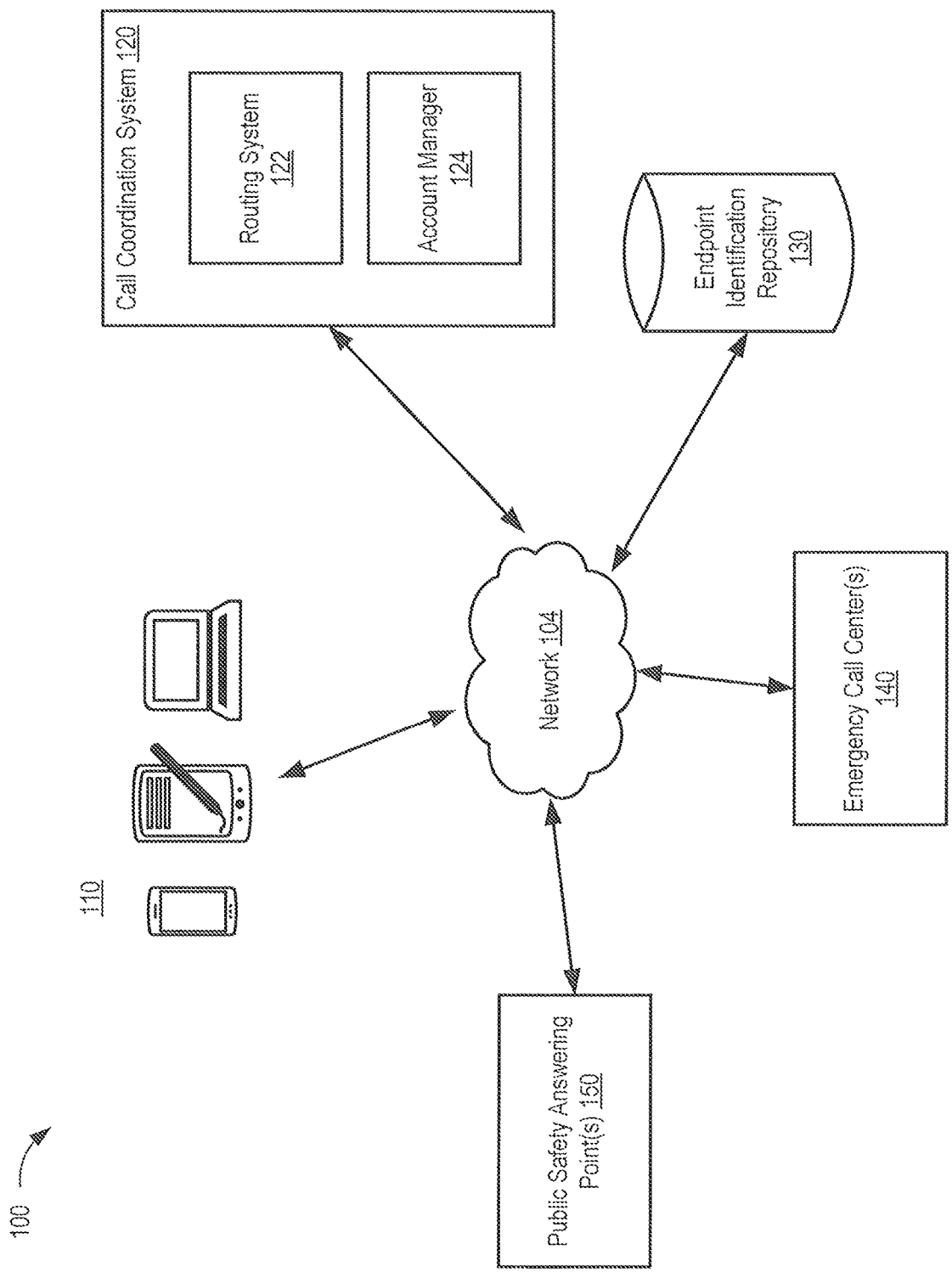
FIG. 1 illustrates an embodiment of an environment for emergency call services.

Voice over Internet Protocol (VoIP) networks can be configured to manage two types of emergency calls: standard VoIP 911 calls, which are referred to as "static," and Dynamic Location Routing (DLR) calls, which are referred to as "dynamic." In the case of static calls, the caller's location is preset and remains consistent. Dynamic calls, on the other hand, utilize DLR technology. The DLR technology can be designed to synchronize the caller's fluctuating location with network data, facilitating more accurate and immediate routing to the closest Public Safety Answering Point (PSAP).

Conventionally, emergency service (ES) providers have configured their systems to handle diverse types of emergency calls by establishing separate accounts for each of these distinct types of traffic-static and dynamic-even when these accounts are intended to serve the same client entity (e.g., customer). Each account can be associated with one or more endpoint records (e.g., telephone numbers, address element unique identifiers (AEUIs), and a client entity might possess both a static-type account and a dynamic-type account. This traditional approach can introduce a variety of operational complexities and necessitate additional resource management. Specifically, each separate account may mandate that emergency calls be directed through unique IP addresses, each of which requires its own SIP peering connection. Thus, a client entity's device, capable of initiating both static and dynamic emergency calls, may be configured to transmit these calls over separate IP addresses. For example, if a client entity had multiple ES accounts of different types, such as standard VOIP 911 ("Dash") and DLR X-Y and DLR-Teams, each of these accounts required its own unique source IP address(es). Additionally, the fragmented management of accounts can generate certain disadvantages, especially in the context of volume-based arrangements. Due to this isolated management of accounts and considering that each account is associated with its own set of endpoint records, the potential to combine call volumes or aggregate endpoint records to achieve more favorable conditions becomes restricted. This separation can influence the resource management and the cost-efficiency offered to client entities within the overall system.

To address these challenges, the inventive concepts disclosed herein introduce a call coordination system configured to manage the reception of both static-type and dynamic-type emergency calls via a singular set of SIP peering connections and a single IP address. The inventive approach advantageously mitigates the need for managing discrete IP addresses and individualized SIP peering connections for each type of emergency call traffic. Within this framework, individual accounts, whether of a static or dynamic nature, can be systematically restructured into hierarchical parent-child relationships, thereby forming linked accounts that can include both static-type and dynamic-type ES accounts. Consequently, the call coordination system can be configured to receive various types of emergency traffic-whether static or dynamic-through a single IP address, determine the call type upon reception, and process the calls in a manner commensurate with their identified call type.

The inventive concepts disclosed herein advantageously enable the integration of multiple types of ES accounts into a unified structural framework, which can facilitate efficient management and routing of both static-type and dynamic-type emergency calls. Within this architectural design, individual accounts, whether static or dynamic in nature, can be systematically restructured into hierarchical parent-child relationships, thereby forming linked accounts. Such accounts can encompass both static-type and dynamic-type ES accounts. A client entity with both static-type and dynamic-type accounts can thus have these accounts synergistically connected. By adhering to defined consolidation policies, conditions such as the absence of duplicate endpoint records across linked accounts can be maintained. This methodological approach to account association can introduce a greater degree of operational flexibility, extending from accounts tied to a single client entity to those spanning multiple client entities. Consequently, the inventive concepts enable the management and processing of emergency calls in a manner that enables reaching service tiers (e.g., based on a collective number of endpoint records) that might be unattainable when accounts are managed individually.

In alignment with the inventive concepts described herein, a call coordination system can be configured to receive any of multiple types of traffic-static or dynamic emergency calls-via a singular IP address. Upon receiving each call, which may include a SIP INVITE message, the call coordination system can determine the call type and process or direct it in accordance with the identified call type. In some cases, conditions associated within the SIP header, such absence or presence of location-specific data within the SIP header, are indicative of the call type. For instance, if the SIP header is absent of location data, the call coordination system can categorize the incoming call request as a static-type emergency call. Conversely, the presence of location data within the SIP header can be an indicator for the call coordination system to classify the call request as dynamic-type emergency call. Furthermore, in some cases, the location data itself can be used to delineate the dynamic-type emergency call into various sub-types, such as address-by-value-based (using PIDF-Lo), address-by-reference-based (utilizing geolocation references), X-Y routing-based (employing latitude-longitude coordinates), or Microsoft Teams-based (a variant of PIDF-Lo). Through the targeted analysis of SIP headers, the call coordination system can be configured to accurately determine the call type of each incoming call request and process it accordingly. This can advantageously enhance the operational efficiency and reliability of emergency call services.

Environment Overview

FIG. 1 illustrates an embodiment of an environment 100 that includes a network 104, a user device 110, a call coordination system 120, an endpoint identification repository 130, an emergency call center (ECC) 140, and a Public Safety Answering Point (PSAP) 150. In the illustrated embodiment, the call coordination system 120 includes a routing system 122 and an account manager 124. To simplify discussion and not to limit the present disclosure, FIG. 1 illustrates only one user device 110, call coordination system 120, endpoint identification repository 130, ECC 140, and PSAP 150, though multiple may be used.

Any of the foregoing components or systems of the environment 100 may communicate via the network 104. The network 104 can enable the transmission of data packets between the components of the system, including the user device 110, the call coordination system 120, the endpoint identification repository 130, the ECC 140, and/or the PSAP 150. The network 104 can support static and dynamic emergency calls from the same or different IP address, facilitating a wide range of call formats and associated data such as SIP INVITE headers and PIDF-Lo headers. Although only one network 104 is illustrated, multiple distinct and/or distributed networks 160 may exist. The network 104 can include any type of communication network. For example, the network 104 can include one or more of a wide area network (WAN), a local area network (LAN), a cellular network, an ad hoc network, a satellite network, a wired network, a wireless network, and so forth. In some embodiments, the network 104 can include the Internet.

Any of the foregoing components or systems of the environment 100, such as any one or any combination of the user device 110, the call coordination system 120, the routing system 122, the account manager 124, the endpoint identification repository 130, the ECC 140 and/or the PSAP 150 may be implemented using individual computing devices, processors, distributed processing systems, servers, isolated execution environments (e.g., virtual machines, containers, etc.), shared computing resources, or so on. Furthermore, any of the foregoing components or systems of the environment 100 may host or execute one or more client applications, which may include a web browser, a mobile application, a background process that performs various operations with or without direct interaction from a user, or a "plug-in" or "extension" to another application, such as a web browser plug-in or extension.

The user device 110 can serve as an endpoint for initiating emergency calls. Example user devices 110 can include, but are not limited to smart phones, tablet computers, handheld computers, wearable devices, laptop computers, desktop computers, fixed-line telephones, office phones, Voice over IP (VoIP) phones, satellite phones, and other communication-enabled devices.

The user device 110 can be configured to transmit calls of a 'static' type. For example, the user device 110 can transmit static emergency calls employing standard VOIP 911 telephone numbers in 10- or 11-digit configurations. Furthermore, the user device 110 can be configured to transmit calls of a 'dynamic' type. For example, the user device 110 can transmit dynamic emergency calls that leverage DLR protocols. These dynamic type calls can employ AEUIs, which can serve as non-variable alpha-numeric strings uniquely associated with the user device 110. Dynamic type calls may include sub-types such as address-by-value-based calls utilizing PIDF-Lo headers ("PIDF-Lo"), address-by-reference-based calls with geolocation references ("geolocation reference"), X-Y routing-based calls employing latitude and longitude ("latitude-longitude"), or a PIDF-Lo variant for Microsoft Teams ("PIDF-Lo variant").

The user device 110 can be configured to accommodate the transmission of multiple types of emergency calls, specifically both static and dynamic types. In some such cases, the user device 110 can transmit these disparate types of calls over a single IP address (or multiple source IP addresses for redundancy purposes). Conventionally, separate accounts were required for static and dynamic emergency traffic. Each account typically utilized its own IP address to connect to the ES provider, a factor influenced by the different SIP peering connections associated with each type of traffic. Such a fragmented approach could lead to unfavorable terms in contractual arrangements, as accounts were assessed individually. For example, this approach can prevent client entities that had both static- and dynamic-type accounts from potentially reaching a more advantageous tier that could be available through a unified approach.

In contrast, under the framework of inventive concepts, a single IP address can serve as a unifying point of origination for emergency calls from multiple accounts of different types. For example, the multiple accounts can be organized hierarchically into parent-child structures. In such a configuration, an IP address can be linked to the parent account and all child accounts can inherit this IP address, which they use for the routing of emergency calls.

The arrangement of utilizing a single IP address for multiple accounts can streamline network configurations and can reduce administrative overhead. When an emergency call is initiated, the system's internal protocols can accurately identify the originating account. This identification can be based on either a 10-digit TN in the case of static (standard VoIP 911) calls, or an AEUI for those related to dynamic (DLR) calls. Subsequently, the call can be routed and processed in accordance with the rules and configurations that are specific to the identified account. This inventive concept adeptly consolidates the management of various telecommunications ES accounts, facilitating the prompt and precise routing of emergency calls without the cumbersome limitations commonly found in conventional systems.

The call coordination system 120 manages and routes emergency calls, connecting them to the appropriate ECC 140 or PSAP 150. The call coordination system 120 includes the routing system 122 and the account manager 124. In some cases, the call coordination system 120 can include the endpoint identification repository 130.

The routing system 122 directs incoming emergency calls to their appropriate destinations, such as the ECC 140 or the PSAP 150. The routing system 122 can receive blended traffic, which may include both static and dynamic emergency traffic, from a user device 110 via a single IP address (or a set of IP addresses). Upon receiving a call, the routing system 122 can classify the call type in accordance with a routing policy. The routing policy can serve as a navigation tool for effectively managing the varied types of emergency calls. Specifically, the routing policy can set out rules for determining the call types based on the SIP headers received. For instance, the routing policy can stipulate that calls devoid of location data in the SIP header(s) are to be classified as a static type, whereas those with location data in a SIP header should be categorized as a dynamic type.

As an example, the routing policy can designate that if a SIP PIDF-Lo includes a civic address, the routing system 122 should classify the call as a dynamic type, specifically a DLR Location-by-Value (LBV) type. Similarly, the routing policy can designate that if the SIP PIDF-Lo includes Latitude/Longitude coordinates, the call should be classified as a dynamic type, specifically an LBV type. As another example, the routing policy can designate that if the SIP Geolocation header(s) includes a geolocation_ID reference, the call should be categorized as a dynamic type, specifically a DLR Location-by-Reference (LBR) type. As another example, the routing policy can designate that if the SIP Geolocation header(s) includes latitude-longitude coordinates, the routing system 122 should classify the call as a dynamic type, specifically as a DLR latitude-longitude type. In some cases, as a fallback mechanism, the routing policy can prescribe that if the SIP PIDF-Lo and SIP Geolocation header(s) do not include the location data-such as a civic address, Latitude/Longitude coordinates, or a geolocation_ID reference—the call should be classified as a static type. This can ensure that even calls lacking geolocation data are routed to an appropriate ECC 140 or the PSAP 150.

For static-type emergency calls, the routing system 122 can route these calls directly to predetermined destinations, utilizing predefined routes or pathways (e.g., stored in the endpoint identification repository 130). For dynamic-type emergency calls, the routing system 122 can engage in a more intricate decision-making process, such as using the location data from the SIP headers or leveraging real-time geolocation data to consult the endpoint identification repository 130 and determine the most suitable PSAP 150 for the call based on this updated geolocation information.

The routing system 122 can be configured to determine the associated account for incoming emergency calls, based on factors such as, but not limited to, the endpoint identifier within the call request and/or the IP address over which the call was received. For example, when a call is received, the routing system 122 can consult the endpoint identification repository 130 to cross-reference the incoming IP address against a database containing IP-address-to-account mappings. Similarly, the routing system 122 can consult the endpoint identification repository 130 to cross-reference the associated endpoint record against a database containing endpoint record-to-account mappings. Understanding the associated account can facilitate proper routing, as well as other purposes such as billing optimization and compliance with regulatory mandates. In some cases, after identifying the pertinent account family and/or type of call, the routing system 122 can scrutinize other parameters, for example to ensure that these parameters align with the endpoint identifiers and types of calls specified within the account family.

The account manager 124 can be configured to organize and manage a portfolio of accounts related to emergency call services. Each account can be associated with one or more endpoint records (e.g., telephone numbers), which can be stored in the endpoint identification repository 130. These accounts can be tied to various client entities, each of which may maintain multiple accounts. Each account linked to a specific client entity can be associated with a unique type of emergency call. For example, one account connected to a first client entity can be associated with static-type emergency calls, whereas a second account linked to the same client entity may be associated with dynamic-type emergency calls. By this methodology, the account manager 124 can effectively oversee a wide spectrum of accounts that are connected to multiple client entities.

The account manager 124 can facilitate various forms of account associations. These associations can be applied to accounts linked to a single client entity or span multiple client entities to create linked accounts (sometimes referred to as a family). In scenarios where accounts are pre-existing, the account manager 124 can either merge these accounts into a unified account or restructure them to form a newly configured account. For accounts that are newly established, the account manager 124 can create a singular account to facilitate the creating of the linked accounts.

In some cases, the linked accounts can be implemented as a hierarchical arrangement, in which accounts are organized into parent/child relationships. For example, the account manager 124 may "demote" one of the accounts to become a child account of the other, now the parent. As another example, the account manager 124 can create a new empty account as the parent and assign the existing accounts as child accounts. Such a hierarchical structure can be useful for accommodating a broad range of account types, including, but not limited to, static-type and dynamic-type accounts, under a structured, tiered framework. For example, the consolidation can positively impact the overall management and coordination of accounts, allowing for a more streamlined approach that may lead to more favorable terms under certain contractual arrangements. For example, if both account "A" and "B" have 4,000 endpoint records, the linked account configuration allows the combined 8,000 records to be assessed together, potentially reaching a tier that might otherwise be unattainable when accounts are assessed individually.

In certain instances, the account manager 124 establishes the linked accounts based on a consolidation policy. The consolidation policy can serve as a set of guidelines or instructions for creating the linked accounts (e.g., the family of parent and child accounts). Within this framework, the consolidation policy may specify the designation of a particular type of account as the parent account, or conversely, the selection of a specific type as the child account. For instance, the consolidation policy might dictate that the top-level, or parent, account within a family must be a standard VOIP 911 account. In addition or alternatively, the consolidation policy may stipulate limitations on the inclusion of specific account types. For example, it could specify that a linked account may include one or more additional standard VOIP 911 child accounts or include DLR Location by Value (LBV) child accounts utilizing SIP PIDF-Lo (address), possibly including DLR-Teams sub-accounts. As another example, the consolidation policy may outline that a linked account can include DLR Location-by-Value (LBV) child accounts with the X-Y routing attribute enabled or accommodate DLR Location-by-Reference (LBR) child accounts using SIP Geolocation header(s) with geolocation_ID references to pre-validated addresses.

When the account manager 124 establishes linked accounts using multiple accounts, the endpoint records across the linked accounts coexist within the same account family. In such scenarios, the consolidation policy can dictate the absence of duplicate endpoint records across the linked accounts. This, for instance, can obviate the need for redundant provisioning of endpoint records when telephone numbers are shared across multiple platforms and softphone instances. To achieve this de-duplication, the account manager 124 can undertake management of the endpoint records within the linked accounts, ensuring the absence of duplicates. For example, in some cases, the account manager 124 can analyze the endpoint records across the linked accounts and eliminate or remove any instances of duplication. In some instances, the consolidation policy indicates to remove the duplicate endpoint record from the child account rather than the parent account. In some instances, the consolidation policy indicates to remove the duplicate endpoint record from the parent account rather than the child account. By taking these measures, the account manager 124 effectively reduces the overall expenses incurred by a client entity, such as those based on the total number of endpoint records in their account family. As an alternative approach, the account manager 124 can modify a duplicate record to render it distinct. For instance, the account manager 124 may append a "1" to the beginning of the endpoint record, thereby resolving the duplication issue. As a result, with multiple accounts structured within a hierarchical family of linked accounts, the account manager 124 can scan through all accounts of the linked accounts to find matching endpoint records for every incoming call. This process can enhance operational efficiency.

The endpoint identification repository 130 can store and retrieve various forms of data for the accurate and efficient routing of emergency calls. Such data can include, but is not limited to, caller location, call type, and endpoint records, each corresponding to a different account or sub-account within the system.

Endpoint records within the endpoint identification repository 130 can be variable and can be contingent on the call type of account they are associated with. For instance, in a standard VOIP 911 account, endpoint records can be telephone numbers (TNs) that can be processed into a standardized 10-digit format for internal matching and routing. AS another example, DLR accounts can use AEUIs as endpoint records. AEUIs can be alpha-numeric and are non-variable, offering greater flexibility for specialized and commercial platforms that require unique identification methods. The repository can be configured to perform internal conversions for TNs while retaining the original format of AEUIs, thereby enabling a seamless interaction between different types of accounts.

The endpoint identification repository 130 can include or be implemented as cloud storage, such as Amazon Simple Storage Service (S3), Elastic Block Storage (EBS) or CloudWatch, Google Cloud Storage, Microsoft Azure Storage, InfluxDB, etc. The endpoint identification repository 130 can be configured to provide high availability, highly resilient, low loss data storage. The endpoint identification repository 130 can include Amazon CloudWatch metrics. In some cases, to provide the high availability, highly resilient, low loss data storage, the endpoint identification repository 130 can store multiple copies of the data in the same and different geographic locations and across different types of data stores (e.g., solid state, hard drive, tape, etc.). Further, as data is received at the endpoint identification repository 130 it can be automatically replicated multiple times according to a replication factor to different data stores across the same and/or different geographic locations.

The ECC 140 receives incoming emergency calls that are channeled through the call coordination system 120, as described herein. These emergency calls can include endpoint identifiers, such as telephone numbers or AEUI-Identifiers, and/or headers like SIP INVITE and PIDF-Lo. Upon receipt, the ECC 140 can execute conversions to translate these varying endpoint identifiers into a standardized 10-digit format. The ECC 140 can match these standardized identifiers against the endpoint records stored in the endpoint identification repository 130. Utilizing the matched endpoint records and the parsed SIP INVITE and PIDF-Lo headers, the ECC 140 can identify a suitable PSAP 150 to which the call should be routed.

The PSAP 150 serves as a destination for incoming emergency calls that have been processed and routed by the ECC 140. Upon receipt of these calls, the PSAP 150 gains access to endpoint records and additional data headers, such as SIP INVITE and PIDF-Lo, which are forwarded from the ECC 140. This information aids the PSAP 150 in determining the nature of the emergency, the id_client entity of the caller, and the geographic location from which the call originated. Based on this consolidated information, the PSAP 150 activates appropriate emergency response services, such as police, fire, or medical units, to respond to the situation in a targeted manner.

Example Hierarchical Account Linking

As described herein, the account manager 124 can facilitate various forms of account associations. In some cases, the account manager 124 can link accounts to form a hierarchical arrangement, where accounts are organized into parent/child relationships. In certain instances, the account manager 124 establishes these linked accounts based on a consolidation policy, which can serve as a set of guidelines or instructions for creating the linked accounts and managing potential duplicates within the accounts.

Figure 2A:
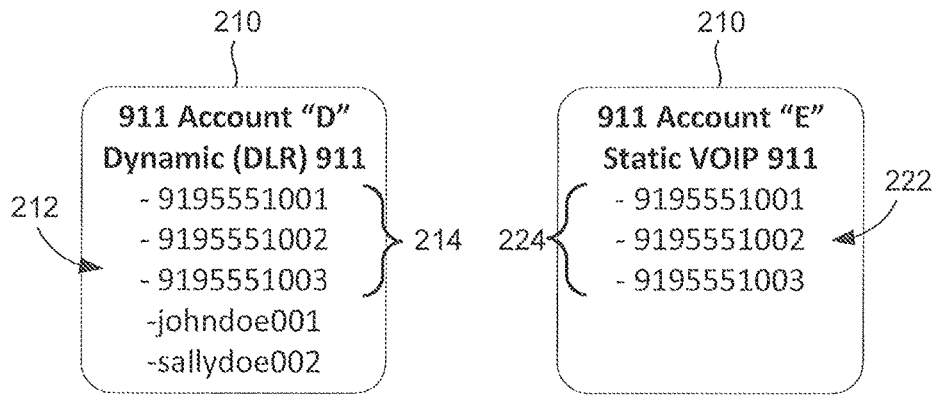
FIG. 2A illustrates data structures representing two independent ES accounts.

FIG. 2A illustrates data structures representing two independent ES accounts, specifically 911 Account "D" 210 and 911 Account "E" 220. Account "D" represents a DLR account, containing five endpoint records, three of which are identified by AEUI in 10-digit format and two in a "user_name" alpha-numeric format. Account "E" is a standard VOIP 911 account containing three TN-based endpoints, which match the first three records in Account "D."

Figure 2B:
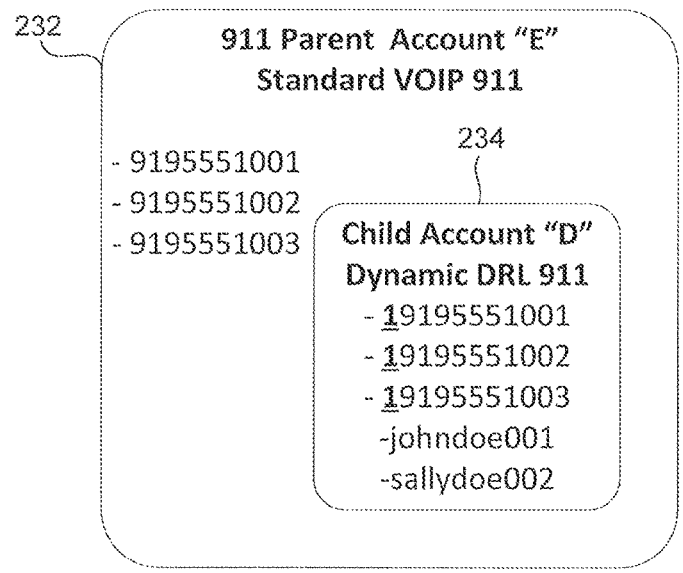
FIGS. 2B and 2C illustrate example linked accounts.

FIG. 2B illustrates an example of a linked account, where 911 Parent Account "E" 232 is established as the parent, and Child Account "D" 234 is designated as the child. This hierarchical linking of accounts can be performed by the account manager 124 based on a consolidation policy. In this example, the linking leads to the presence of three identical endpoint identifiers within the collective linked account, namely: 9195551001, 9195551002, and 9195551003. To resolve this duplication, the account manager 124 can differentiate the DLR AEUI-Identifiers from the 10-digit format of the standard VOIP 911 endpoint TNs by pre-pending a "1" to the DLR endpoint identifiers. While this configuration links the accounts, enables all 911 traffic to originate from the same IP source address, and results in the duplication of three endpoints, it leads to a total of eight (5+3) endpoints.

Figure 2C:
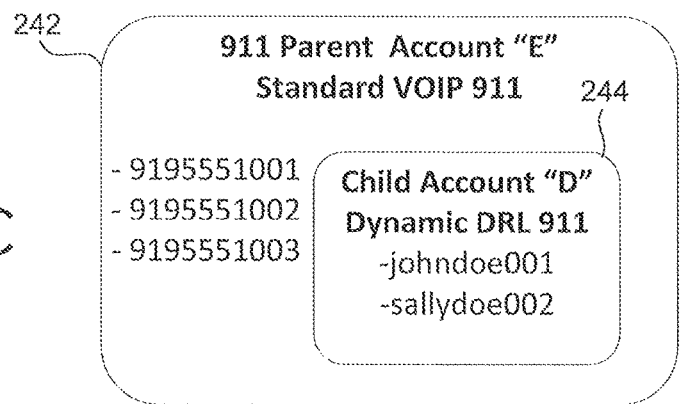

FIG. 2C illustrates another example of a linked account, where 911 Parent Account "E" 242 and Child Account "D" 244 are linked in a manner that reduces the endpoints to five (2+3). In this configuration, as differentiated from the example of FIG. 2B, the account manager 124 does not prepend a "1" to any "TN-like" AEUI identifiers in the DLR account. Instead, the account manager 124 removed duplicate identifiers, thereby reducing the total number of endpoints to five. In some cases, the outcome shown in FIG. 2C is advantageous over the one shown in FIG. 2B, since the total number of endpoints are reduced, while enabling all 911 traffic to originate from the same IP source address.

The configurations depicted in FIG. 2A-2C illustrate various methodologies for linking standard VOIP 911 accounts with DLR accounts within a hierarchical structure. These configurations are advantageous for minimizing endpoint count, thereby enhancing system resource utilization. Through the implementation of these inventive concepts, a more streamlined and effective approach to managing ES accounts is realized. Such configurations facilitate the efficient handling of diverse ES call types, contributing to improvements in overall emergency response operational efficiency.

Example SIP INVITE Messages

A user device 110 can transmit a call request that serves as a precursor to the actual establishment of an ES call. A component of this call request can be a SIP (Session Initiation Protocol) INVITE message. The SIP INVITE message can commence the call setup process and can include a variety of headers and parameters for establishing the connection between the user device and the call coordination system 120.

As described herein, the call coordination system 120 can determine a call type based on the application of a routing policy. The routing policy can set out rules predicated on the call types of SIP headers received. For instance, the routing policy can stipulate that calls devoid of location data in the SIP header(s) (e.g., "geolocation," "pidflo,") are to be classified as a static type, whereas those with location data in a SIP header should be categorized as a dynamic type.

FIG. 3A illustrates a SIP INVITE message that contains a range of headers, including but not limited to "original_host," "call_id," "dnis," "from," "account_id," and "contact." Additionally, the message features a PIDF-LO header represented in XML, tagged as "pidflo." The header also includes civic address components in the encoded XML, evidenced by elements like "ca:c/v/cAddress", "ca:CAMPUS", and "ca:HNO."

The presence of civic address data within the "pidflo" header informs the call coordination system 120's routing decision-making. In alignment with the routing policy, the call coordination system 120 can classify this emergency call as a dynamic type, specifically as a DLR Location-by-Value (LBV) account focusing on civic address data. This classification ensures that the emergency service call is routed effectively to the appropriate Emergency Call Center (ECC) or Public Safety Answering Point (PSAP) based on the encoded civic address within the "pidflo" header.

FIG. 3B illustrates a SIP INVITE message with headers like "siteid," "peer_ip," "original_host," "call_id," "dnis," "from," "reserve_esqk," "account_id," and "contact." This message also contains a PIDF-LO header encoded in XMIL, tagged as "pidflo." Within the "pidflo" XML, there are Lat/Long coordinates represented by "<gml:Point srsName='urn:ogc:def:crs:EPSG::4326'>gml:pos35.773376-78.677722</gml:pos></gml:Point>."

Based on the routing policy, the inclusion of Latitude/Longitude coordinates within the "pidflo" header allows the call coordination system 120 to categorize the emergency call as a dynamic type. Specifically, the call can be classified as a DLR Location-by-Value (LBV) account with the X-Y routing attribute enabled. This ensures that the call is properly routed to the appropriate ECC or PSAP based on the Latitude/Longitude geolocation data encoded in the "pidflo" header.

FIG. 3C illustrates a SIP INVITE message containing headers such as "siteid," "peer_ip," "original_host," "call_id," "dnis," "from," "reserve_esqk," "account_id," and "contact." This message also includes a "geolocation" header with a URI "https://emergency.bandwidth.com/locations/9900812/TestNC."

In accordance with the predefined routing policy, the "geolocation" header containing a geolocation_ID reference enables the call coordination system 120 to categorize the emergency call as a dynamic type. Specifically, the call can be directed to a DLR Location-by-Reference (LBR) account. By doing so, the call is appropriately routed to an ECC or PSAP based on the geolocation_ID information contained in the "geolocation" header.

FIG. 3D illustrates a SIP INVITE message similar to FIG. 3C, with the absence of a "geolocation" header or "pidflo" header. The headers include "siteid," "peer_ip," "original_host," "call_id," "dnis," "from," "reserve_esqk," "account_id," and "contact."

According to the routing policy, the lack of geolocation data in the SIP INVITE message leads the call coordination system 120 to categorize the call as a static type by default. This default categorization ensures that the call is routed to a standard VOIP 911 account, allowing it to reach an ECC or PSAP even when specific geolocation information is not provided.

Consolidated Account Structures

Some inventive concepts herein relate to an advancement in the management of emergency services accounts within telecommunication systems. For example, the inventive concepts afford the capacity to aggregate endpoint records from divergent account types, such as standard VOIP 911 and DLR, into a cohesive account family. This capability represents a departure from previous limitations, thereby introducing a more versatile and efficient paradigm for the management and routing of emergency services telephony.

Figure 4:
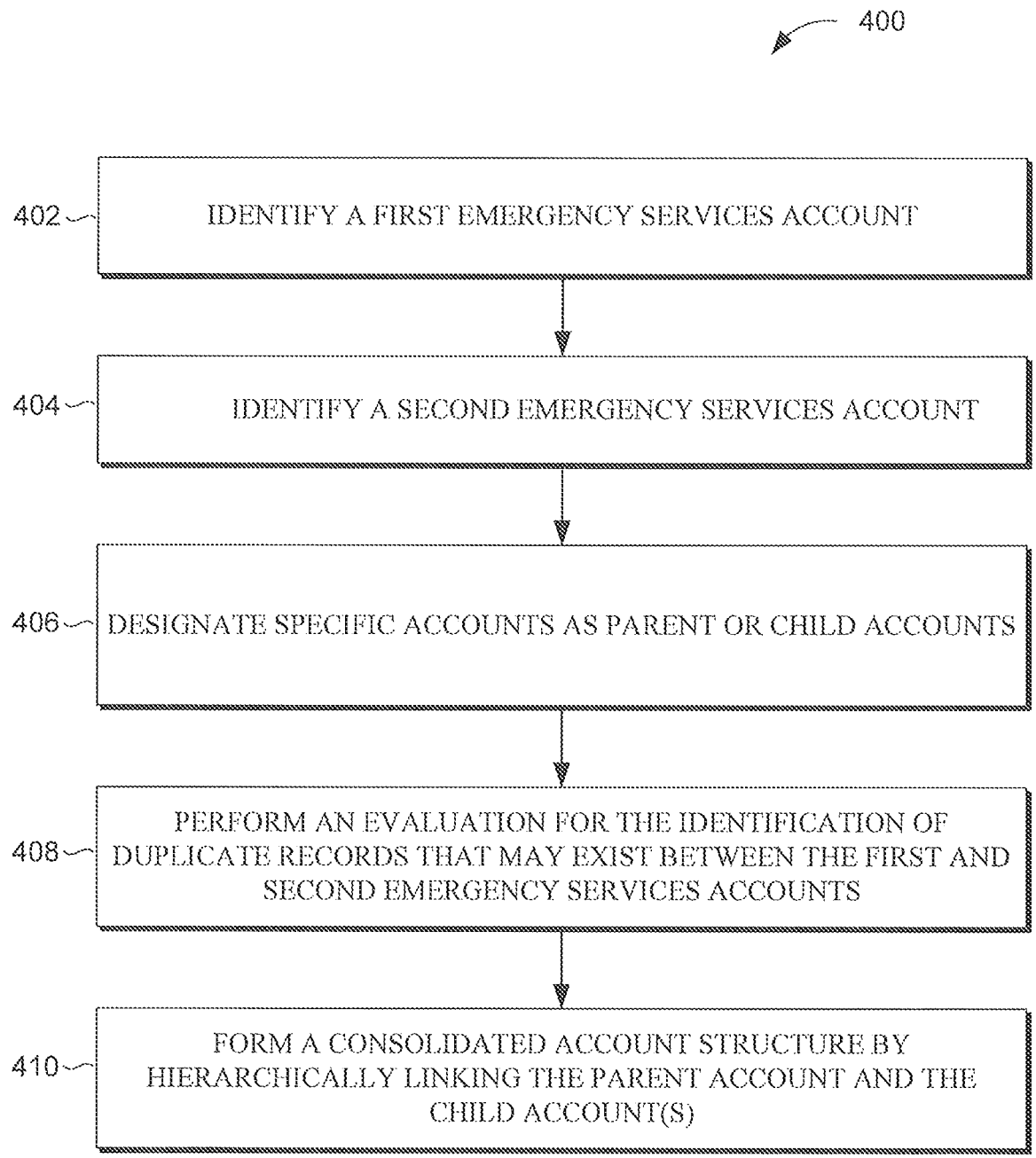
FIG. 4 illustrates an example routine for creating a consolidated account structure for emergency services telephony calls within a communication system.

FIG. 4 illustrates an example routine 400 for creating a consolidated account structure for emergency services telephony calls within a communication system. Although described as being implemented by the call coordination system 120, it will be understood that one or more elements outlined for routine 400 can be implemented by one or more computing devices/components that are associated with the environment 100, such as, but not limited to, routing system 122, the account manager 124, or the endpoint identification repository 130. Thus, the following illustrative embodiment should not be construed as limiting. It will be understood that the described routine 400 can include more, different, or fewer blocks than those explicitly enumerated.

At block 402, the call coordination system 120 identifies a first emergency services account. As described herein, the call coordination system 120 can organize and manage a portfolio of accounts related to emergency call services. Each account can be associated with one or more endpoint records. Furthermore, each emergency services account can be linked to a specific client entity or entity that either holds ownership or is otherwise associated with the account. Moreover, each account linked to a specific client entity can be associated with a unique type of emergency call (e.g., static-type and dynamic-type accounts). For enhanced clarity in this illustrative example, the first emergency services account includes a plurality of first records, is associated with a first client entity, and is a static-type account.

At block 404, the call coordination system 120 identifies a second emergency services account. For enhanced clarity in this illustrative example, the second emergency services account includes a plurality of second records, is associated with the same first client entity, and is a dynamic-type account.

In some embodiments, the call coordination system 120 can be configured to identify both the first and second emergency services accounts as suitable candidates for linkage within the overarching emergency response framework. This decision to flag these accounts for potential linkage can be predicated on any of various factors. For example, the accounts might be deemed candidates for linkage based on overlapping client entity associations, wherein both accounts are tied to the same first client entity, thereby streamlining managerial oversight. Alternatively, the linkage could be based on the accounts being serviced by the same set of emergency response units, facilitating a more cohesive and effective dispatch process. In some instances, the linkage of the accounts can be user designated. For example, the first client entity associated with both accounts might explicitly instruct that these accounts be linked, thereby providing an additional layer of customization and control.

At block 406, the call coordination system 120 can be configured to designate specific accounts as parent or child accounts based on a predefined consolidation policy. The consolidation policy can serve as a set of rules and guidelines governing the hierarchical organization of accounts. In some embodiments, the consolidation policy stipulates that accounts categorized as static types should be preferentially designated as parent accounts. In scenarios where both the first and second emergency services accounts are of the static type, the call coordination system 120 may invoke additional parameters delineated within the consolidation policy to select between the two. It will be appreciated that, in other examples, the consolidation policy stipulates that accounts categorized as dynamic types should be preferentially designated as parent accounts.

The hierarchical structuring of accounts as parent and child entities can enable a more streamlined management and coordination of accounts. For example, if two linked accounts, designated as "A" and "B," each contain 4,000 endpoint records, their hierarchical linkage allows for the collective assessment of 8,000 records. This cumulative assessment could lead to more advantageous terms under certain contractual arrangements, potentially reaching service tiers that would be unattainable when accounts are assessed individually.

In some instances, the consolidation policy may contain explicit specifications concerning account types that can be included within the hierarchical structure. For instance, it may dictate that a parent account must be a standard VOIP 911 account or alternatively, it may set limitations on the types of child accounts, such as those utilizing SIP PIDF-Lo addresses or those with enabled X-Y routing attributes.

For purposes of this example, the first emergency services account is a static-type account, the second emergency services account is a dynamic-type account, and the consolidation policy indicates that accounts categorized as static types should be preferentially designated as parent accounts. Consistent with the provisions of the consolidation policy, the call coordination system 120 can assign the role of the parent account to the first emergency services account. Concurrently, the second emergency services account is designated as the child account within this hierarchical structure.

At block 408, the call coordination system 120 can be configured to perform an evaluation for the identification of duplicate records that may exist between the first and second emergency services accounts. Specifically, the system can compare the plurality of first records in the first emergency services account with the plurality of second records in the second emergency services account. When such duplicates are detected, the consolidation policy can provide directives on how to handle these duplicate records within the linked accounts. In some cases, such directives can mitigate the need for redundant provisioning of endpoint records when the same identifiers, such as telephone numbers, are shared across multiple platforms or instances of soft-phone configurations.

To enact a de-duplication, the call coordination system 120 can analyze the endpoint records across both accounts and identify records that match or are closely related (e.g., differ by a leading "1"). In instances where duplicate records are detected, the consolidation policy can prescribe the removal or modification of such duplicates from the linked accounts. For example, some modification strategies include appending a unique numerical prefix, such as "1," to an endpoint record to render it distinct from its duplicate counterpart. In some cases, the consolidation policy may specify that duplicate records should be removed or modified from the child account. In other cases, the consolidation policy may indicate that such actions should be undertaken on the parent account instead.

At block 410, the call coordination system 120 can form a consolidated account structure by hierarchically linking the parent account (in this case, the first emergency services account) and the child account (in this case, the second emergency services account). Forming the consolidated account can include configuring the child account to inherit an IP address associated with the parent account for the purpose of routing emergency calls. This configuring can include mapping the child account to the IP address. In this way, the call coordination system 120 can receive an emergency services call request via the inherited point of presence that now corresponds to both accounts.

Emergency Services Telephony Calls

Some inventive concepts herein pertain to a call coordination system that can be configured to handle a multitude of emergency call types-both static and dynamic-through a singular IP address. This configuration can notably elevate the operational efficiency and reliability of emergency services.

Figure 5:
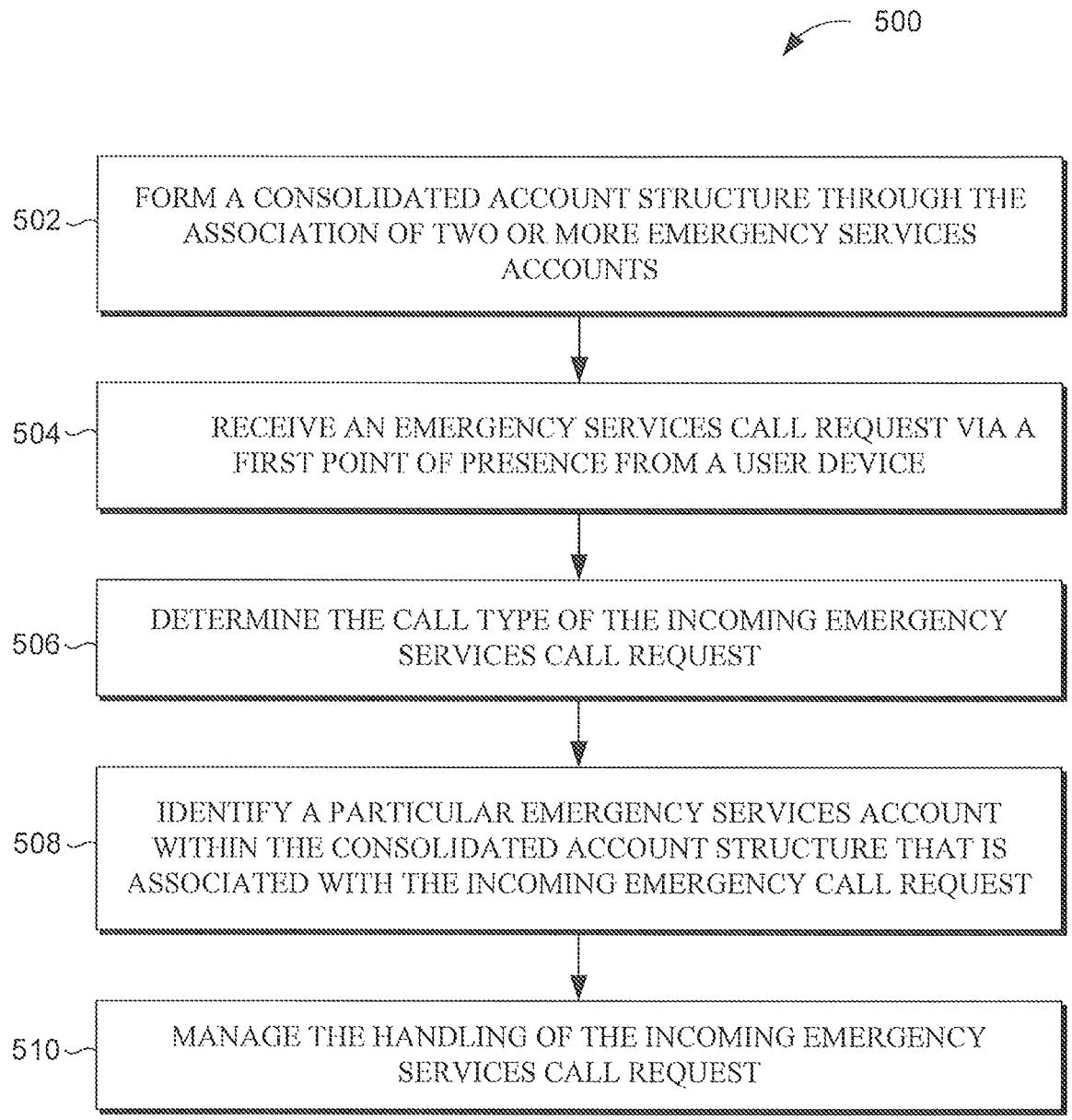
FIG. 5 illustrates an example routine for handling emergency services telephony calls within a communication system.

FIG. 5 illustrates an example routine 500 for handling emergency services telephony calls within a communication system. Although described as being implemented by the call coordination system 120, it will be understood that one or more elements outlined for routine 500 can be implemented by one or more computing devices/components that are associated with the environment 100, such as, but not limited to, routing system 122, the account manager 124, or the endpoint identification repository 130. Thus, the following illustrative embodiment should not be construed as limiting. It will be understood that the described routine 500 can include more, different, or fewer blocks than those explicitly enumerated.

At block 502, the call coordination system 120 forms a consolidated account structure through the association of two or more emergency services accounts. Each of these accounts can be typified by a unique call type, which serves as an indicator of a specialized methodology employed for the processing of location data. Additionally, each emergency services account may encompass multiple endpoint records. Specifically, the consolidated structure can include a first emergency services account characterized by a plurality of first records associated with a distinct first call type, and a second emergency services account characterized by a plurality of second records associated with a divergent second call type. It should be noted that the first call type can be different from the second call type, manifesting as, for example, static-type and dynamic-type classifications. This consolidated account structure is capable of incorporating accounts pertinent to both static-type and dynamic-type emergency calls.

The formation of the consolidated account structure can involve executing one, some, or all of the procedural steps delineated in routine 400 as depicted in FIG. 4. While this activity is discussed within the context of routine 500, in some cases, block 502 may be separated or removed from routine 500. For instance, the formation of the consolidated account structure can occur in advance of the reception of a call request, as indicated at block 504.

At block 504, the call coordination system 120 receives an emergency services call request via a first point of presence from a user device 110. This request can include an endpoint identifier, as well as other information as described herein. As described herein, the user device 110 is configured to accommodate the transmission of multiple types of emergency calls, specifically both static and dynamic types. In some such cases, the user device 110 can transmit these disparate types of calls over the first point of presence.

At block 506, the call coordination system 120 is configured to determine the call type of the incoming emergency services call request. This determination can be predicated on either the presence or absence of location data within the call request. To achieve this, the call coordination system 120 can review the SIP (Session Initiation Protocol) header associated with the call request. In scenarios where location data is present in the SIP header, the call can be classified as a dynamic type; conversely, the absence of such data can signify a static type. Furthermore, in some cases, the call coordination system 120 can recognize various sub-types of dynamic emergency calls, based on the specific nature of the location data encapsulated within the SIP header.

It is to be noted that user device 110 is engineered to transmit any of static or dynamic types of emergency calls. The call coordination system 120, in turn, can possess the capability to differentiate among these diverse types of 911 traffic. Upon reception of an emergency call, the call type may initially be unknown to call coordination system 120. The call coordination system 120 is equipped to determine the call type in line with a routing policy, which can serve as a navigational tool for efficaciously handling assorted emergency call types.

By way of example, the routing policy can specify that calls with a SIP PIDF-Lo containing a civic address are to be earmarked as dynamic types, more precisely, as a DLR Location-by-Value (LBV) type. Similarly, calls with SIP PIDF-Lo containing latitude-longitude coordinates would be categorized as dynamic types, also falling under the LBV type. If the SIP Geolocation header incorporates a geolocation_ID reference, the call would be identified as a dynamic type, specifically as a DLR Location-by-Reference (LBR) type. As a fail-safe mechanism, the routing policy can prescribe that in instances where neither the SIP PIDF-Lo nor the SIP Geolocation headers include any form of location data, the call should be assigned a static-type classification. This can ensure that calls devoid of geolocation data are still effectively routed to an appropriate Emergency Call Center (ECC) 140 or Public Safety Answering Point (PSAP) 150.

At block 508, the call coordination system 120 is configured to identify a particular emergency services account within the consolidated account structure that is associated with the incoming emergency call request, utilizing the endpoint identifier as a key criterion. The identification process can include identifying the emergency services account within the consolidated structure that includes an endpoint record congruent with the provided endpoint identifier.

In some cases, the routing system 122 can be adapted to determine the account affiliated with an incoming emergency call, predicated on various parameters. These parameters can include, but are not restricted to, the endpoint identifier present within the call request and the IP address via which the call is received. For instance, upon call reception, the routing system 122 may query the endpoint identification repository 130 to match the incoming IP address with pre-existing IP-address-to-account mappings housed within a database. Analogously, the routing system 122 may consult the same repository to correlate the specified endpoint record with endpoint record-to-account mappings. Recognizing the account associated with an incoming call not only enables precise routing but also serves ancillary functions such as facilitating billing processes and ensuring compliance with legal regulations.

At block 510, the call coordination system 120 is configured to manage the handling of the incoming emergency services call request, based on the identified call type and/or the specific emergency services account. For emergency calls characterized as static-type, the routing system 122 can be configured to channel these calls toward pre-established destinations, using pre-defined routing schematics or pathways that are stored within the endpoint identification repository 130. Conversely, for emergency calls of the dynamic-type, the routing system 122 can execute a more nuanced routing algorithm. This may entail parsing location data embedded within the SIP headers or harnessing real-time geolocation metrics to consult the endpoint identification repository 130. Based on this updated geolocation information, the routing system 122 can determine the most appropriate Public Safety Answering Point (PSAP) 150 to which the call should be directed.

Terminology

It is understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still falls within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this present disclosure may include, additional to its essential features described herein, one or more features as described herein from each other embodiment of the present disclosure disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in various combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some cases, the actual steps taken in the processes illustrated and/or disclosed may differ from those shown in the figures. In at least some examples, the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey cases include, while other embodiments do not include, features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain cases require the presence of at least one of X, at least one of Y, and at least one of Z.

Language of degree used herein, such as the terms "approximately," "about," "generally," and "substantially"

as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

That which is claimed is:

1. A method of handling emergency services telephony calls within a communication system, the method comprising:
   forming a consolidated account structure by associating two or more emergency services accounts, each emergency services account characterized by a distinct call type indicative of a specific methodology for processing location data, and each emergency services account comprising multiple endpoint records, wherein each endpoint record is uniquely identifiable across the consolidated account structure;
   receiving an emergency services call request via a first point of presence, the emergency services call request comprising an endpoint identifier;
   determining a call type of the emergency services call request based on a presence or absence of location data within the emergency services call request, wherein the call type is a static type or dynamic type;
   identifying a particular emergency services account from the consolidated account structure based on the endpoint identifier, wherein the identifying comprises determining which emergency services account of the consolidated account structure comprises an endpoint record corresponding to the endpoint identifier; and
   facilitating processing of the emergency services call request based on the call type and the particular emergency services account.

2. The method of claim 1, wherein forming the consolidated account structure comprises creating a hierarchical account architecture, in which one of the two or more emergency services accounts is designated as a parent account, and all other emergency services accounts are designated as child accounts.

3. The method of claim 2, wherein forming the consolidated account structure includes configuring all child accounts to inherit an IP address associated with the parent account for routing emergency calls.

4. The method of claim 2, wherein forming the consolidated account structure comprises selecting a standard VOIP 911 account as the parent account.

5. The method of claim 1, wherein forming the consolidated account structure comprises analyzing the endpoint records across the consolidated account structure to identify and removing or modifying duplicate endpoint records to ensure their uniqueness within the consolidated account structure.

6. The method of claim 1, wherein the two or more emergency services accounts comprises a first emergency services account and a second emergency services account, wherein the first emergency services account comprises a plurality of first records associated with a first call type, wherein the second emergency services account comprises a plurality of second records associated with a second call type, and wherein the first call type is different from the second call type.

7. The method of claim 1, wherein the consolidated account structure includes accounts associated with both static-type and dynamic-type emergency calls.

8. The method of claim 1, wherein the determining the call type comprises inspecting a SIP header of the emergency services call request for a presence or absence of location data in the SIP header.

9. The method of claim 8, wherein the presence of the location data in the SIP header indicates a dynamic type, and wherein the absence of the location data in the SIP header indicates a static type.

10. The method of claim 8, wherein the determining the call type comprises identifying one or more sub-types of dynamic emergency calls based on location data within the SIP header.

11. A method of creating a consolidated account structure for emergency services telephony calls within a communication system, the method comprising:
    identifying a first emergency services account comprising a plurality of first records, the first emergency services account associated with a first call type indicative of a first methodology for processing location data;
    identifying a second emergency services account comprising a plurality of second records, the second emergency services account associated with a second call type that is different than the first call type, the second call type indicative of a second methodology for processing location data;
    designating the first emergency services account as a parent account based on a consolidation policy, wherein the consolidation policy indicates that an account of the first call type should be selected as the parent account;
    designating the second emergency services account as a child account;
    identifying at least one common record from the plurality of first records and the plurality of second records;
    removing or modifying the common record from the plurality of second records based at least in part on the second emergency services account being selected as the child account; and
    forming a consolidated account structure by hierarchically linking the parent account and the child account, wherein forming the consolidated account structure comprises configuring the child account to inherit a point of presence associated with the parent account for routing emergency calls,
    wherein emergency calls associated with any of the first emergency services account or the second emergency services account can be transmitted over the inherited point of presence.

12. The method of claim 11, wherein the first call type is a static type and the second call type is a dynamic type.

13. The method of claim 11, further comprising:
receiving an emergency services call request via the inherited point of presence, the emergency services call request comprising an endpoint identifier; and
identifying a particular emergency services account from the consolidated account structure based on the endpoint identifier, wherein the identifying comprises determining which emergency services account of the consolidated account structure comprises an endpoint record corresponding to the endpoint identifier.

14. The method of claim 13, further comprising:
determining a call type of the emergency services call request based on a presence or absence of location data within the emergency services call request, wherein the call type is a static type or dynamic type; and
facilitating processing of the emergency services call request based on the call type.

15. The method of claim 14, wherein the determining the call type comprises inspecting a SIP header of the emergency services call request for the presence or absence of location data.

16. The method of claim 15, wherein the presence of the location data in the SIP header indicates a dynamic type, and wherein the absence of the location data in the SIP header indicates a static type.

17. The method of claim 15, wherein the determining the call type comprises identifying one or more sub-types of dynamic emergency calls based on location data within the SIP header.

18. Non-transitory computer readable media comprising computer-executable instructions that, when executed by a computing system, cause the computing system to:
receive an emergency services call request via a first point of presence, the emergency services call request comprising an endpoint identifier;
determine a call type of the emergency services call request based on a presence or absence of location data within the emergency services call request, wherein the call type is a static type or dynamic type;
identify a particular emergency services account from a consolidated account structure based on the endpoint identifier, wherein to identify comprises determining which emergency services account of the consolidated account structure comprises an endpoint record corresponding to the endpoint identifier; and
facilitate processing of the emergency services call request based on the call type and the particular emergency services account.

19. The non-transitory computer readable media of claim 18, wherein the consolidated account structure is formed by associating two or more emergency services accounts, each emergency services account characterized by a distinct call type indicative of a specific methodology for processing location data, and each emergency services account comprising multiple endpoint records, wherein each endpoint record is uniquely identifiable across the consolidated account structure.

20. The non-transitory computer readable media of claim 18, wherein the consolidated account structure is formed by creating a hierarchical account architecture, in which one of the two or more emergency services accounts is designated as a parent account, and all other emergency services accounts are designated as child accounts, and by configuring all child accounts to inherit an IP address associated with the parent account for routing emergency calls.

* * * * *